3,197,368
PROCESS FOR THE PREPARATION OF NATURAL CHOLINE PHOSPHORIC ACID DIGLYCERIDE ESTER COMPOUNDS
Gertrud Lappe, nee Reuter, Cologne-Lindenthal, and Hans Eikermann, Cologne-Braunsfeld, Germany, assignors to A. Nattermann & Cie, Cologne-Braunsfeld, Germany
No Drawing. Filed June 2, 1961, Ser. No. 114,286
Claims priority, application Germany, Dec. 5, 1960, N 19,273
10 Claims. (Cl. 167—58)

This invention relates to a process for the preparation of water soluble choline phosphoric acid diglyceride ester compounds.

Natural choline phosphoric acid diglyceride esters with a high content of unsaturated and essential fatty acids and free from colamine phosphoric acid diglyceride esters, are known to possess considerable importance in biology and medicine. These esters may be obtained by the process described and claimed in our copending applications Ser. No. 694,524, filed Nov. 5, 1957, now abandoned, and Ser. No. 26,954, filed May 5, 1960, now Patent No. 3,031,478, from crude vegetable phosphatides, especially from soya bean crude phosphatides in which the crude phosphatide is extracted with acetone, the extraction residue is freed from acetone in vacuo and repeatedly extracted with alcohol, the alcoholic solutions are allowed to stand for several days, and then freed from the suspended or colloidal substances dissolved therewith all steps being carried out at a temperature not exceeding 35° C. and with exclusion of air or oxygen in the presence of an inert gas. Finally, for the purpose of separation of the choline phosphoric acid diglyceride esters from colamine phosphoric acid diglyceride esters, the alcoholic solution is passed with exclusion of light and air or oxygen over a column which is filled with an alcoholic suspension of an oxide or carbonate of one or more elements of groups II, III and IV of the perodic table, then the suspension is eluted with alcohol and finally the alcoholic solutions which run off in vacuum are concentrated in the presence of an inert gas.

In order to be able to administer the above mentioned esters more easily, to inject them parenterally and especially intravenously, it was considered desirable to convert these water-insoluble esters into water-soluble compounds, particularly into water-soluble compounds which are stable to a practically unlimited extent, despite their content of unsaturated and essential fatty acids which are particularly subject to oxidative treatment due to their double bonds.

It is known that water-soluble molecular compounds are formed from bile acids and fats, as also lipoids, which are known to include the choline phospholipids. In this connection it will be seen from the following references to the literature, that the molecular compounds formed from fats and like compounds on the one hand and bile acids or the like on the other hand have considerable importance for metabolism in the human organism:

In the Lehrbuch der Physiologischen Chemie, Leipzig 1850, 2nd edition, it was pointed out that the bile acids are capable of fat emulsification. It was furthermore already known at that time that the phospholipids, which occur in the bile, further activate the emulsifying action of the bile acids. The best known bile acids occurring in the liver are able to form molecular compounds with lipids and lipoids. Through these molecular compounds the formerly insoluble substances are made water-soluble. With these complexes an exchange of the vitally necessary lipids or lipoids takes place in the cell metabolism processes. They are irreplaceable in the physiological processes.

Morre and Rockwood (Proc. Roy. Soc., London 1896, 60, 438–442) mention in their reports the solubility of the fats in solutions of bile acids. They were able to demonstrate that oleic acid is dissolved to 4–5% in the bile itself, while stearic acid is much less soluble. When the two acids are mixed, however, the solubility of the mixture is increased to 15%. By adding a large portion of $Na_2CO_3$ the solubility could even be doubled. If the free fatty acids were replaced by neutral fats, the solubility became appreciably less.

H. Wieland and H. Sorge (Z. physiol. Chem., 1916, 87, 1–27) first introduced the concept of the taurocholic acids. These relate to addition compounds of fatty acids to acids of the bile acid group. The two authors found that a true complex formation only takes place with desoxycholic acid and apocholic acid. Desoxycholic acid is a saturated acid with two hydroxyl groups, a dihydroxycholic acid; apocholic acid is an unsaturated acid also with two hydroxyl groups, a dihydroxycholenic acid. The other bile acids also form addition compounds. Biologically the adducts of desoxycholic acid are of most importance. Thus J.C.M. Verschure (Clin. chim. acta, Amsterdam, 1956, 1, 511–518), by paper electrophoresis and investigations in the ultracentrifuge, could detect a high molecular complex from lecithin and desoxycholate occurring in the human gall bladder. The components were present in the ratio 1:8.

A. E. Meyer and J. P. McEven (Am. J. Physiol., 1948, 153, 386–392) ascertained that even desoxycholic acid and cholic acid, when they are brought on the surface of cell walls, are able to bring about metabolic processes by their chemical molecular compounds. They even affect the peristaltic movements. Desoxycholic acid was known as the most active acid. It was able to form the macromolecular taurocholic acid.

H. Rheinboldt and co-workers (Ann., 1927, 451, 256–273 and Ann., 1929, 473, 249–259) also investigated the taurocholic acids and the systems of substances associated with them. They are obtained from an alcoholic solution of desoxycholic acid and stearic acid to form a molecular compound which has a sharp melting point. The compound was so stable that it could not be split either by hydrogenation or by oxidation.

The number of moles of bile acids, especially of desoxycholic acid or apocholic acid, linked with 1 mol of fatty acid is a function of the molecular size of the fatty acids. For the higher members of the fatty acid series the number is always 8. In the formation of taurocholic acid the fatty acids enter into the lattice of the bile acids. The Röntgen interferences are practically unaltered by this addition. The fatty acids are deposited in the gaps which the bile acids form. They move to some extent into the channels present in the lattice. It is thus clear that the ratio of the number of mols of fatty acids to desoxycholic acid increases with an increasing number of carbon atoms in the carbon chain. It has been found, however, that the channels need not be completely filled up. Gaps may occur between the double molecules of the fatty acids.

G. Giocomello and E. Bianchi (Gazz. chim. Ital., 1943, 3, 73) were able to presume these arrangements from X-ray structural analysis, but they were not satisfactorily proved until now.

Rheinboldt was able to show that the bile acids form molecular compounds not only with fatty acids, but also with alicyclic acids or their compounds which have a long side chain.

From the known state of the art it is clear that relatively large amounts of bile acid salts are necessary in order to form water-soluble compounds from the latter and, for example, lecithin, 8 mol of bile acids to each mol of lecithin being in fact required.

According to the present invention there is provided a process for the preparation of water-soluble choline phosphoric acid diglyceride ester compounds which comprises reacting natural choline phosphoric acid diglyceride esters having a high content of unsaturated and essential fatty acids and free from colamine phosphoric acid diglyceride esters in alkaline medium with an aqueous solution of a salt of bile acids, wherein less than one mol of the salt of bile acids is used per mol of ester. The lowest ratio is about 0.8 mol of said salt per mol of ester. There can be used a sodium, potassium, magnesium or calcium salt of a bile acid. The desoxycholic acid is to be preferred for the purpose of the present invention.

The diglyceride esters which can be prepared in accordance with the co-pending patent applications Serial No. 694,524, filed Nov. 5, 1957, and Serial No. 26,954, filed May 5, 1960, comprise, e.g., more than 80.0% of unsaturated fatty acids of which the greatest part consists of essential fatty acids. To give an example: in the content of 82.3% of unsaturated fatty acids the oleic acid content is 17.2%, the linoleic content is 52%, and the linolenic acid content is 13.1%.

The pH value of the reaction mixture is preferably above 8; it can if necessary be corrected with N—NaOH. As is known the natural phosphoric acid diglyceride esters are themselves very alkaline.

A clear aqueous solution results and only long-chain fatty acids are present in the esters.

Moreover up to 50% of the diglyceride ester fraction may be replaced by lysolecithin, in which case the quantity of the bile acids salt required for the process of the present invention is still further reduced. For this purpose a lysolecithin is advantageously used which is obtained by the process disclosed in our copending applications Ser. No. 694,524, filed Nov. 5, 1957, and Ser. No. 26,954, filed May 5, 1960, from the choline phosphoric acid diglyceride esters. Such a lysolecithin has about 28% of essential fatty acids in relation to the total fatty acids.

According to a further embodiment of the invention the very dilute alcoholic solution obtained from the process of our copending applications, Ser. No. 694,524, filed Nov. 5, 1957, and Ser. No. 26,954, filed May 5, 1960, which contains about 1% of diglyceride esters may be employed as the initial material when it is treated as such with a small quantity of alpha-tocopherol before the alcohol is distilled off under reduced pressure in the presence of an inert gas, such as nitrogen or $CO_2$, after which the reaction of the adduct in the form of a pasty mass from the diglyceride esters and alpha-tocopherol with a salt of bile acids as indicated above is carried out. It has in fact been surprisingly found that the reaction of the adduct with the salt of bile acids yields a water-soluble compound, although as is known the alpha-tocopherol itself is not soluble in water.

The alpha-tocopherol serves not only for the protection of the unsaturated, especially the essential, fatty acids to oxidation, but the substance known as vitamin E possesses also a biological-therapeutic intrinsic value which is of additional medicinal significance in the product of the process of the present invention. For the process of the invention quantities of alpha-tocopherol are sufficient which are of the order of magnitude of 0.2% per gram of choline phosphoric acid diglyceride esters; larger amounts, however, may also be used when this is desired on medical grounds. Up to 2% of alpha-tocopherol may be added to the diglyceride esters or to the mixture of diglyceride esters and lysolecithin; the addition product forms a water-soluble complex with the salt of bile acids.

The invention will now be further described by way of examples.

EXAMPLES (1) 600 g. of natural choline phosphoric acid diglyceride esters comprising in relation to the total fatty acids present as ester constituents more than 80% of unsaturated and essential fatty acids and free from colamine phosphoric acid diglyceride esters are treated with 500 ml. of a desoxycholic acid solution prepared as given below, in an atmosphere of nitrogen with continuous stirring. A viscous mass is formed. The remaining quantity of desoxycholic acid solution is added over a period of 1½ hours. After all the reaction and solution processes are completed, it is made up to the final concentration (12 litres) with water adjusted to a pH value of about 7.8 with N—NaOH.

(2) 60 litres of a 1% alcoholic solution of natural choline phosphoric acid diglyceride esters such as are used according to Example 1, are treated with 1.32 g. of alpha-tocopherol acetate. The alcoholic solution may be prepared as given below. After the latter has gone completely into solution, the alcohol is distilled off under reduced pressure in the presence of an inert gas, and a product of a pasty nature is obtained. 600 g. of this are treated with 500 ml. of a desoxycholic acid solution prepared as given below, in an atmosphere of nitrogen with continuous stirring. A viscous mass is formed. The remaining quantity of desoxycholic acid solution is added over a period of 1½ hours. After all the reaction and solution processes are completed, it is made up to the final concentration (12 litres) with water adjusted to a pH value of about 7.8 with N—NaOH.

*Preparation of desoxycholic acid solution*

240 g. of desoxycholic acid are suspended in 2 litres of water and slowly treated with a NaOH (24 g. of NaOH in 500 ml. of water) while boiling until a clear solution is obtained. After the solution is quite cold the pH value is checked and if necessary corrected to about 8 with N—NaOH.

*Preparation of alcoholic solution of diglyceride esters*

The alcoholic solution of natural choline phosphoric acid diglyceride esters with a high content of unsaturated and essential fatty acids and free from colamine phosphoric acid diglyceride esters used for the process of the invention may be prepared, for example, as follows:

8 kg. of crude soya bean phosphatides are repeatedly extracted with 150 litres of acetone at a temperature not exceeding 35° C., in order to free them from oily constituents. The residue is freed from acetone in vacuo and in the presence of an inert gas, after which the residue is extracted several times with ethanol, again at a temperature not exceeding 35° C., and with exclusion of light, and air or oxygen, while an inert gas is passed through the extraction apparatus. The alcoholic solutions obtained in the extraction are united and allowed to stand for several days in order to free them from suspended or colloidally dissolved substances therein, which settle and are removed by filtering or decanting the alcoholic solution. One litre of the alcoholic solution obtained in this way, which contains substantially choline phosphoric acid diglyceride esters, is diluted to 2–3% with alcohol and, over a period of 10 hours with exclusion of light and air or oxygen is passed over an absorption column of, for example 4 cm. in diameter, in which is a suspension of 10% of magnesium oxide and aluminium oxide in ethanol. After the alcoholic solution has passed through the column, the latter is eluted with 3 litres of ethanol. The alcoholic solutions obtained contain natural choline phosphoric acid diglyceride esters free from colamine phosphoric acid diglyceride esters, which contain at least 66% of essential fatty acids referred to the total amount of fatty acids present.

Where lysolecithin is to be used, it may be prepared from the alcoholic solution of the natural choline phosphoric acid diglyceride esters free from colamine phosphoric acid diglyceride esters by the concentration in vacuo in the presence of an inert gas. 5.7 g. of these choline esters are dissolved in 570 cc. of peroxide-free ether, treated with 6 cc. of an aqueous solution of 18 mg. of snake venom (*Crotalus adamanteus*) and after repeated shaking up, are allowed to stand for 24 hours at room temperature. Then disregarding the sediment formed, the solvent is distilled off in vacuo. 2.9 g. of choline esters of the monoglyceride phosphoric acid lysolecithin are obtained, which contains 28% of polyunsaturated essential fatty acids, calculated on the total fatty acids.

The water soluble choline phosphoric acid diglyceride ester compounds prepared in accordance with the present invention are very helpful means for treating arteriosclerosis and diabetes. The compounds are preferably used in the form of a 5 or 10% aqueous solution which are administered parenterally or intravenously.

What we claim is:

1. Process for the preparation of water-soluble choline phosphoric acid diglyceride ester compounds which comprises reacting natural choline phosphoric acid diglyceride esters having a high content of unsaturated and essential fatty acids and free from colamine phosphoric acid diglyceride esters in alkaline medium with an aqueous solution of a salt of bile acids wherein at least 0.8 mol but less than one mol of the salt of bile acids is used per mol of ester, said salt being a salt of a member of the group consisting of sodium, potassium, magnesium, and calcium.

2. Process as claimed in claim 1, in which lysolecithin replaces up to 50 percent of the choline phosphoric acid diglyceride esters.

3. Process as claimed in claim 2, in which lyso-compounds obtained from the natural choline phosphoric acid diglyceride esters free from colamine phosphoric acid diglyceride esters containing unsaturated and essential fatty acids are used as reactants.

4. Process as claimed in claim 1, in which a very dilute alcoholic solution of said diglyceride esters is treated with alpha-tocopherol to form an adduct therewith, the alcohol subsequently removed under reduced pressure in the presence of an inert gas, said adduct being reacted with said salt of bile acids.

5. Process as claimed in claim 4 in which the quantity of alpha-tocopherol is 0.2% per gram of choline phosphoric acid diglyceride ester.

6. Process as claimed in claim 1 in which the sodium salt of desoxycholic acid is used as a salt of bile acids.

7. Water-soluble adducts of 1 mole of a choline phosphoric acid diglyceride ester with 0.8 to less than 1 mole of a salt of a bile acid, said salt being a salt of a member of the group consisting of sodium, potassium, magnesium, and calcium.

8. The water-soluble adduct of 1 mole of a choline phosphoric acid diglyceride ester having a high content of unsaturated and essential fatty acids with 0.8 to less than 1 mole of sodium desoxycholate.

9. An aqueous solution of the adduct defined in claim 7, suitable for injections.

10. An aqueous solution of the compound defined in claim 8, suitable for injections.

References Cited by the Examiner

UNITED STATES PATENTS 2,055,083  9/36  Klein et al. _____ 167—82.9

OTHER REFERENCES

Trim et al.: Symposia of the Society for Experimental Biology, No. III, 1949, pp. 111–142.

LEWIS GOTTS, *Primary Examiner.*

M. O. WOLK, *Examiner.*